Dec. 28, 1926.
H. B. OHMER
YIELDABLE DRIVING MECHANISM
Filed Feb. 1, 1924
1,611,940
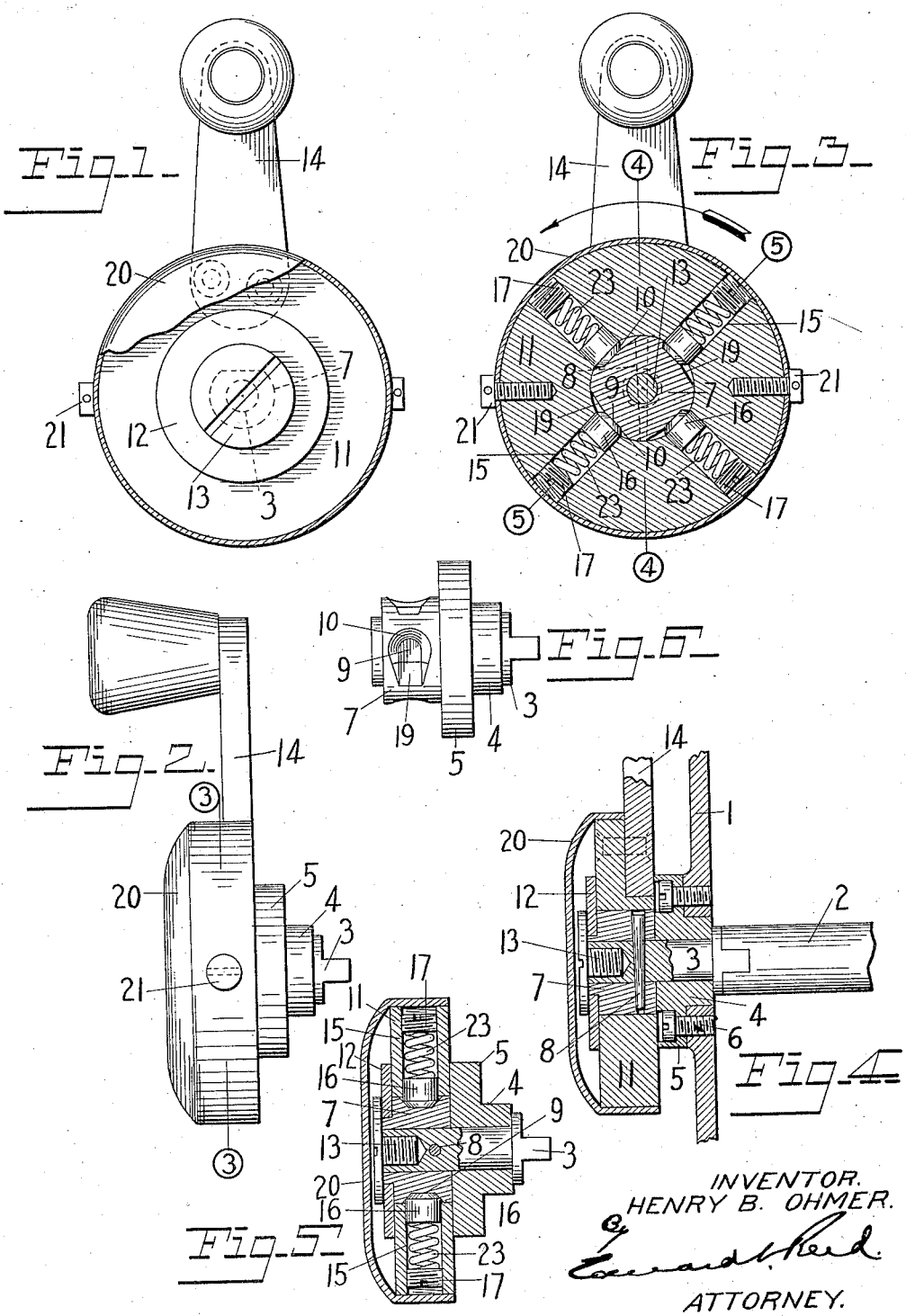

Patented Dec. 28, 1926.

1,611,940

UNITED STATES PATENT OFFICE.

HENRY B. OHMER, OF DAYTON, OHIO, ASSIGNOR TO OHMER FARE REGISTER COMPANY, OF DAYTON, OHIO.

YIELDABLE DRIVING MECHANISM.

Application filed February 1, 1924. Serial No. 690,003.

This invention relates to a yieldable driving mechanism and is designed more particularly for use with the printing mechanism of a taximeter. In taximeters of the type to which this invention is applied the printing mechanism is normally locked against operation and it can only be released for operation by the proper operation of other parts of the taximeter mechanism. If an attempt is made to operate the printing mechanism before the other operations have been properly performed, or when for any other reason the printing mechanism is inoperative, there is serious danger of some part of the mechanism being broken or otherwise injured by excessive pressure applied to the actuating device.

One object of the present invention is to provide means for safeguarding the taximeter mechanism from injury by excessive pressure on the actuating device for the printing mechanism.

A further object of the invention is to provide a driving connection between the printing shaft and its actuating device which, under normal conditions, would cause the printing mechanism to be positively driven but which will yield to permit the actuating device to move forward relatively to the printing shaft when the latter is held against rotation.

A further object of the invention is to provide a device of this kind which will be very simple in its construction and operation, of strong durable character and in which the various parts are readily accessible.

Other objects of the invention will appear as the mechanism is described in detail.

In the accompanying drawings Fig. 1 is a front elevation of a device embodying my invention with the casing partly broken away; Fig. 2 is an edge view of the same; Fig. 3 is a section taken on the line 3—3 of Fig. 2; Fig. 4 is a section taken on the line 4—4 of Fig. 3; Fig. 5 is a section taken on the line 5—5 of Fig. 3; and Fig. 6 is a detail view of one of the connecting members and the bearing.

In these drawings I have illustrated one embodiment of my invention and have shown the same as applied to the printing mechanism of a taximeter but it will be understood that this particular embodiment has been chosen for the purpose of illustration only and that the device itself may take various forms and may be used in connection with mechanisms of various kinds.

The particular device here illustrated comprises two cooperating connecting members or clutch members one of which is connected with the actuating device and the other of which is connected with the printing shaft. The two members of the connecting device have cooperating parts which serve normally to positively connect the two members one to the other but one of which is yieldable to permit that member which is connected with the actuating device to rotate relatively to the member which is connected with the shaft if excessive pressure is applied to the actuating device. In Fig. 4 of the drawings I have shown at 1 a portion of the end wall of a taximeter casing and also a portion of the printing shaft 2. The other parts of the taximeter mechanism are not necessary to an understanding of the invention and therefore I have not illustrated the same. The printing shaft 2 is provided with a reduced end portion 3 which is journalled in a bearing 4 mounted in the end wall 1 of the casing. This end portion of the shaft may, if desired, be formed separate therefrom and detachably connected therewith to facilitate the assembling of the mechanism. The bearing 4 is provided at its outer end with a flange 5 which bears against the end wall of the casing and provides means for connecting the bearing to the casing by suitable fastening devices, such as screws 6. This flanged portion of the bearing also constitutes a face plate which serves a purpose which will hereinafter appear. The end portion 3 of the printing shaft extends beyond the bearing 4 and I have rigidly secured to the outer end of this part of the shaft a connecting or clutch member which is here shown in the form of a hub 7 secured to the shaft by means of a pin 8. The hub is cylindrical in contour and is provided in its periphery with a series of recesses 9 each of which has its forward wall slightly inclined relatively to the corresponding radius of the hub, as shown at 10. Rotatably mounted upon the hub member 7 is a second connecting or clutch member 11 which is here shown in the form of a disk fitting snugly about the cylindrical hub and rotatable thereon. This second connecting member may be secured in position on the hub in any suitable manner but, in the present instance, is confined between the face plate formed by the outer portion of the bearing 4 and a washer 12 mounted on the outer end of the hub and secured in position by a screw 13 which enters the end of the part 3 of the shaft and the head of which overlaps the washer. Rigidly secured to this second connecting member is an actuating device or crank 14 by means of which the printing shaft is operated. This second connecting member is provided with a plurality of radial bores 15 which, in the present instance, extend from the periphery of the disk to the opening in the center thereof and which constitute guideways. Slidably mounted in each guideway is a plunger 16 the inner end of which is arranged to enter one of the recesses 9 in the inner connecting member or hub 7. A spring 23 is mounted in each guideway 15 and acts on the plunger of that guideway to hold the same yieldably in contact with the hub 7. Preferably this spring is confined between the plunger and an adjustable stop which is here shown as a plug 17 screw threaded into the end of the guideway and which may be adjusted to regulate the tension of the spring. The inner end of each plunger is beveled, as shown at 18, at an angle corresponding to the inclination of the front wall of the recess. The inclined front wall of the recess is curved so that the beveled end of the plunger will have contact therewith throughout substantially half of its circumference. The angle of inclination of the front wall of each recess is such that when the several plungers are seated in their respective recesses a very strong positive driving connection will be established between the two parts of the connecting device, but at the same time the inclination of these front walls is such that if excessive pressure is applied to the outer connecting member the inclined walls of the recesses will force the plungers outwardly against the tension of the springs 23, thereby permitting the same to ride out of the respective recesses so that the outer connecting member and the actuating device can rotate relatively to the hub. The tension of the springs 23 and the inclination of the forward walls of the recesses in the hub, which constitute stops, are so adjusted that the plungers will yield and permit the relative movement of the actuating device before sufficient pressure has been applied thereto to injure any part of the mechanism connected with the shaft 2. The rear wall of each recess is cut away, as shown at 19, and the bottom of each recess merges into the peripheral wall of the hub so that if the actuating device 14 is moved in a reverse direction the plungers will simply ride over the hub, which will offer very little resistance to their movement about the same. The connecting device is preferably enclosed in a casing or cap 20 the peripheral portion of which fits snugly about the disk 11 and is secured thereto by means of screws 21. This cap is readily removable and when removed access is had to the connecting devices and by simply removing the screw 13 the connecting mechanism may be separated so that access can be made to the individual parts thereof.

The device as a whole is very simple in its construction and operation and is of a very strong durable character; the parts thereof are not liable to be broken or to be injured; and, further, these parts are readily accessible and the device can be quickly and easily assembled and mounted on the taximeter casing. It will be noted that the construction is such that the connecting device is mounted on the exterior of the taximeter casing and is connected with the shaft 2 within the casing. In this manner the yieldable connection may be applied without in any way modifying the taximeter construction.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is.

1. The combination with a bearing having a flanged portion forming a face plate, a shaft journaled in said bearing, and an actuating device for said shaft, of a connecting device comprising a hub rigidly secured to said shaft adjacent to said face plate and having a plurality of peripheral recesses each having its forward wall inclined, a disk secured to said actuating device and rotatably mounted on said hub, means cooperating with said face plate for holding said disk against axial displacement, said disk having a plurality of radial guideways, a plunger mounted in each of said guideways adapted to enter one of the recesses in said hub, springs acting on said plungers to hold the same in yielding contact with said hub, and a casing having a portion fitting snugly about said disk and enclosing said connecting device.

2. In a taximeter, a casing, a printing shaft rotatably mounted within said casing a bearing removably mounted in a wall of said casing, said shaft comprising a detachable portion journaled in said bearing, a connecting member rigidly secured to said portion of said shaft on the outer side of said bearing, said member having a plurality of peripheral recesses each having an inclined forward wall, a second connecting member rotatably mounted on the first mentioned connecting member and having a plurality of radial guideways, plungers slidably mounted in said guideways and arranged to enter the respective recesses in the first mentioned connecting member, springs acting on said plungers to hold the same in yieldable contact with the first mentioned connecting member, an actuating device secured to said second connecting member, said bearing having a flange arranged to engage one face of said second connecting member, a plate mounted at the outer end of the first mentioned connecting member and overlapping the second connecting member, a screw mounted in the end of said shaft to retain said plate in position, and a cap having a portion fitting about said second connecting member and rigidly secured thereto.

3. In a taximeter, a casing, a printing shaft rotatably mounted within said casing, a bearing removably mounted in a wall of said casing, said shaft comprising a detachable portion journaled in said bearing, a connecting member rigidly secured to said portion of said shaft on the outer side of said bearing, said member having a plurality of peripheral recesses each having an inclined forward wall, a second connecting member rotatably mounted on the first mentioned connecting member and having a plurality of radial guideways, plungers slidably mounted in said guideways and arranged to enter the respective recesses in the first mentioned connecting member, springs acting on said plungers to hold the same in yieldable contact with the first mentioned connecting member, an actuating device secured to said second connecting member, said bearing having a flange arranged to engage one face of said second connecting member, a plate mounted at the outer end of the first mentioned connecting member and overlapping the second connecting member, and a screw mounted in the end of said shaft to retain said plate in position.

In testimony whereof, I affix my signature hereto.

HENRY B. OHMER.